US007832963B2

(12) United States Patent
Heinloth et al.

(10) Patent No.: US 7,832,963 B2
(45) Date of Patent: Nov. 16, 2010

(54) CUTTER SUPPORT AND CUTTER HEAD

(75) Inventors: Markus Heinloth, Postbauer-Heng (DE); Ralk Klötzer, Langewiesen (DE); Helmut Klein, Abenberg (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 2 days.

(21) Appl. No.: 12/282,958

(22) PCT Filed: Apr. 11, 2007

(86) PCT No.: PCT/DE2007/000632

§ 371 (c)(1),
(2), (4) Date: Sep. 15, 2008

(87) PCT Pub. No.: WO2007/115561

PCT Pub. Date: Oct. 18, 2007

(65) Prior Publication Data

US 2009/0092456 A1 Apr. 9, 2009

(30) Foreign Application Priority Data

Apr. 12, 2006 (DE) .................. 20 2006 006 081 U

(51) Int. Cl.
*B23C 5/20* (2006.01)
*B23C 3/06* (2006.01)

(52) U.S. Cl. ........................................ 407/46; 407/108

(58) Field of Classification Search ................. 407/108, 407/46, 47, 107, 101, 102, 66
See application file for complete search history.

(56) References Cited

U.S. PATENT DOCUMENTS

| | | | | |
|---|---|---|---|---|
| 2,780,858 | A * | 2/1957 | Robinson | 407/47 |
| 3,060,554 | A * | 10/1962 | Kirchner | 407/47 |
| 3,667,099 | A * | 6/1972 | Palmer | 428/557 |
| 3,673,657 | A * | 7/1972 | Gustafson et al. | 407/108 |
| 4,181,456 | A * | 1/1980 | Oaks | 407/38 |
| 4,201,501 | A * | 5/1980 | Day | 407/92 |
| 4,264,245 | A * | 4/1981 | Lindsay | 407/41 |
| 7,275,895 | B2 * | 10/2007 | Heinloth | 407/113 |
| 2002/0146292 | A1 | 10/2002 | Shimizu | 407/113 |

FOREIGN PATENT DOCUMENTS

| | | |
|---|---|---|
| DE | 4003862 | 2/1991 |
| DE | 10006431 | 9/2001 |
| DE | 102004022360 | 11/2005 |

* cited by examiner

*Primary Examiner*—Will Fridie, Jr.
(74) *Attorney, Agent, or Firm*—Andrew Wilford

(57) ABSTRACT

The invention relates to a cutter support for fixing in a cutter head, comprising a shaft-like bar and a head with integrated cutters with minor cutters formed from a cutting surface and a free surface. According to the invention, a chamfer adjacent to the minor cutter is arranged on the free surface with a chamfer width decreasing outwardly to 0.

10 Claims, 6 Drawing Sheets

FIG. 9
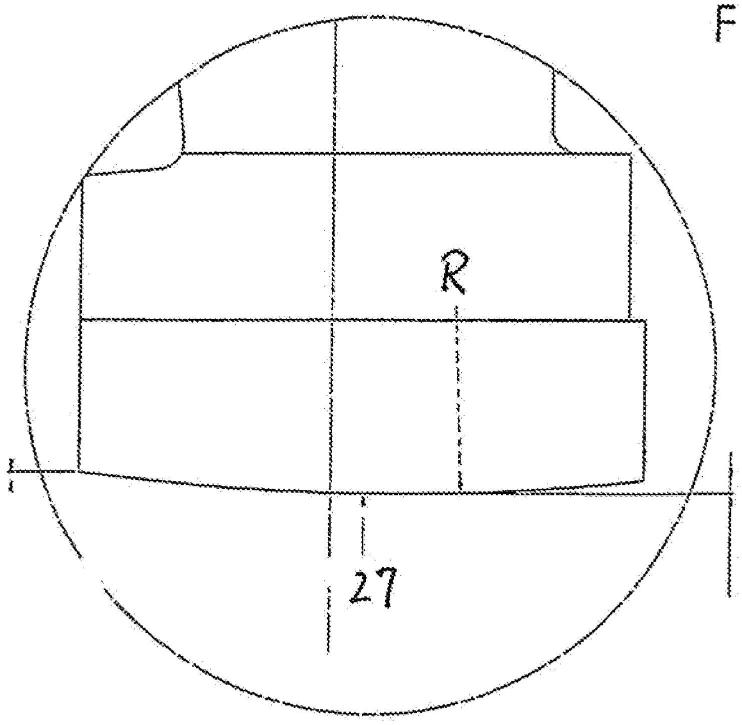
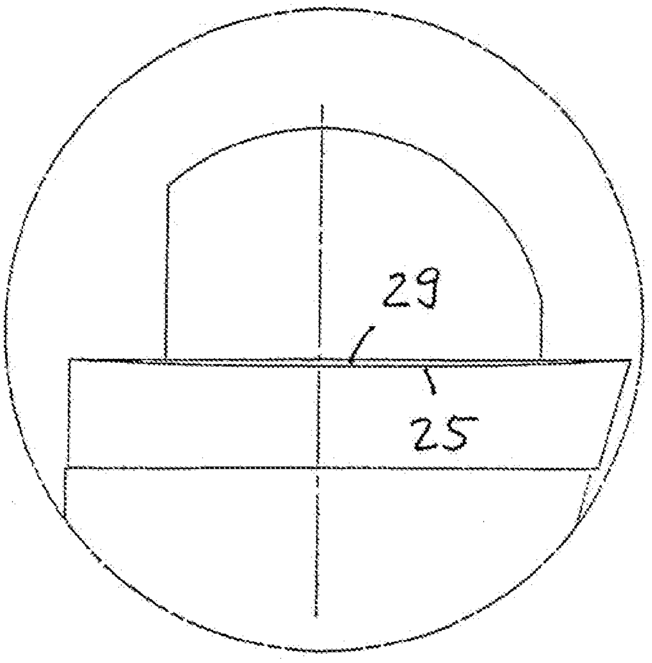
FIG. 10

CUTTER SUPPORT AND CUTTER HEAD

CROSS REFERENCE TO RELATED APPLICATIONS

This application is the US national phase of PCT application PCT/DE2007/000632, filed 11 Apr. 2007, published 28 Oct. 2007 as WO 2007/115561, and claiming the priority of German patent application 202006006081.2 itself filed 12 Apr. 2006, whose entire disclosures are herewith incorporated by reference.

The invention relates to a blade holder for fixing in a milling head, comprising a shaft-like bar and a head having blades attached by soldering and having a lateral cutting edge formed by a cutting face and an open face.

The invention further relates to a milling head having several blade holders placed in seats in a base body, with blades being soldered onto each of the blade holders, the blade holders each being axially displaceable via a wedge and fixable in the milling head by means of clamping elements.

The milling head is known in principle from DE 40 03 862. In the milling head described there, the seats for the blade holders extend from the face of its base body parallel to its rotational axis as well as spacing inward from its outer periphery, with the blades of the cutting plates used protruding only slightly past the face of the base body. Moreover, the axes of the round wedges used for gripping each extend at a small acute angle to the cutting-plate holder. Finally, a additional round wedge with a differential screw is also provided for the axial adjustment of each cutting plate and set in a respective seat that extends radially inward from the outer surface of the base body. Geometrically identical round wedges are used for axial adjustment and clamping directed radially outward. As an advantage of this milling head, the document emphasizes the fact that, due to the position of the seats accommodating the cutting-plate holders parallel to the rotational axis of the base body, only radially oriented centrifugal forces occur without axial components. These forces may be easily absorbed because the seats are not located directly on the outer surface of the base body; rather they are located radially inward at a distance from the outer surface. Therefore, the milling head is also suitable for extremely high rotational speeds and the centrifugal forces that occur at such speeds. It is advantageous for a fine adjustment of the milling elements to be possible axially without overlapping with radial components.

While according to the prior art crankshafts for motor vehicles are subjected to a finishing process by grinding or belt grinding, the milling being performed using cooling lubricants, by virtue of the process with the development of suitable milling tools it became possible for grinding of crankshafts to be replaced by milling. Due to the structure of the crankshafts, orthogonal lathe milling is used with an eccentric tool position without axial advance. Here, the tool performs a plunge motion on the basis of which the design of the bearing seats is exclusively produced by the lateral cutting edge of the tool. Here, the tool must be positioned relative to the workpiece in such a way as to ensure that, on engagement of the lateral cutting edge, the entire crown line of the bearing seat is covered. The bearing seat diameter to be produced is generated via this crown line. By virtue of the process, the central regions of the lateral cutting edge is longer in engagement than other regions. This causes the blade to have a greater degree of wear in the central region than in the outer regions.

Additional details regarding orthogonal lathe milling may be found, for example, in DE 10 2004 022 360 A1. However, orthogonal lathe milling with an eccentric tool position without axial advance has a decisive disadvantage. By virtue of the fact that, in this method, the lateral cutting edge of the tool performs a plunge operation, the smallest errors in cutting or tool wear have an immediate negative effect on the form and surface quality to be achieved. The unevenly distributed tool wear in particular leads to early deviations in shape.

The object of the present invention is to eliminate the disadvantages mentioned above; in particular, a cutting shape should be found that at the same time guarantees workpiece processing in a precise shape in addition to as long a useful life as possible.

The further object of the present invention is to provide an appropriate milling head for this purpose.

The first object mentioned above is attained by a blade holder according to claim 1. According to the invention, the blade holder has a bevel adjacent the lateral cutting edge and formed on the free face, having a bevel width decreasing outward to 0. Additional embodiments of the blade holder are described in the subclaims.

The object is further achieved by a milling head according to claim that is characterized by three blade holders that are set at an equidistant angle to one another.

In the blade holders known from the prior art without the bevel according to the invention, a high level of initial wear resulted in the center of the blade, namely at the point where the blade has the longest contact time with the workpiece. In contrast, regions located on the edges with a substantially shorter cutting engagement showed a lower degree of wear on the free faces. When the blade holder according to the invention was used, on the other hand, it was possible to significantly decrease the tapered wear region with a high degree of initial free face wear, such that it was possible to correspondingly lengthen the region in which the free face wear occurred in a linear fashion.

Additional details of the invention shall be explained with reference to the figures, in which:

FIGS. 8 and 9 are large-scale views of the blades according to FIG. 4 in two different embodiments, FIG. 10 is a top view of the free face of a blade.

Figure 1:
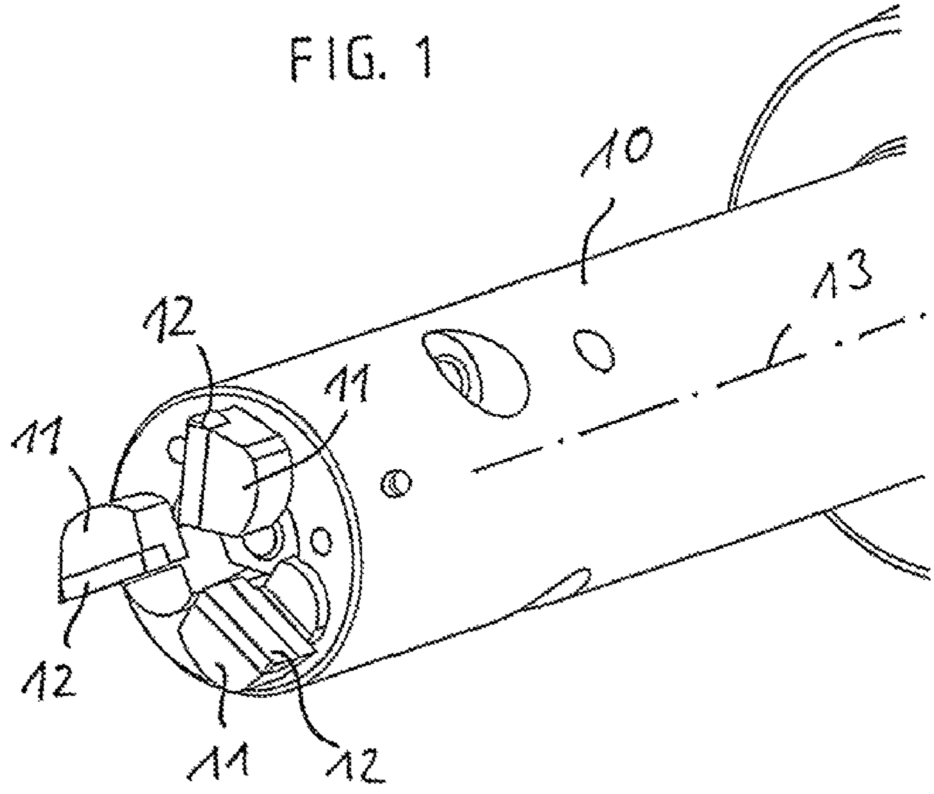
FIG. 1 is a perspective view of a milling head with three blade holders.
Figure 2:
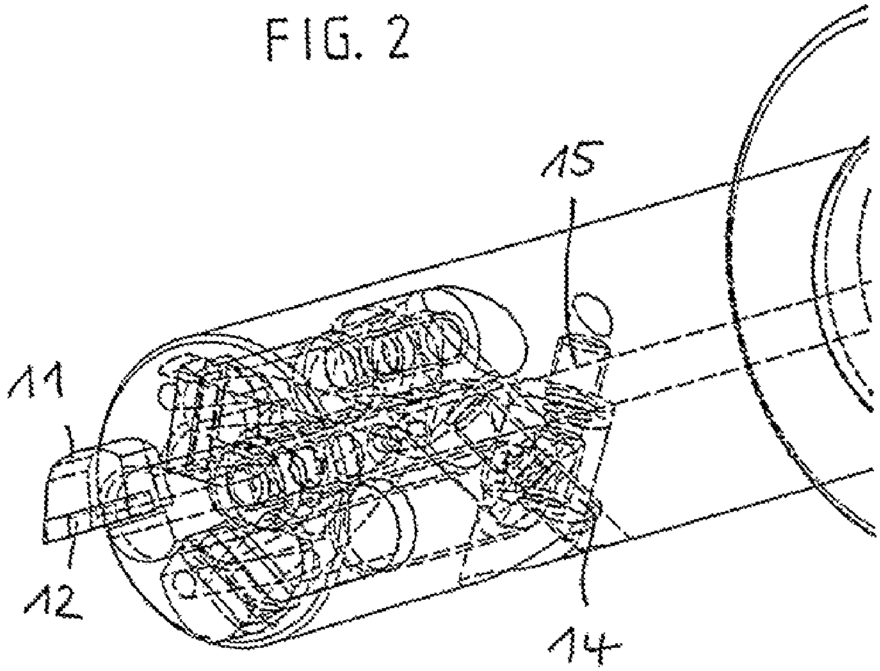
FIG. 2 shows a wire-frame view of the milling head according to FIG. 1.
Figure 3:
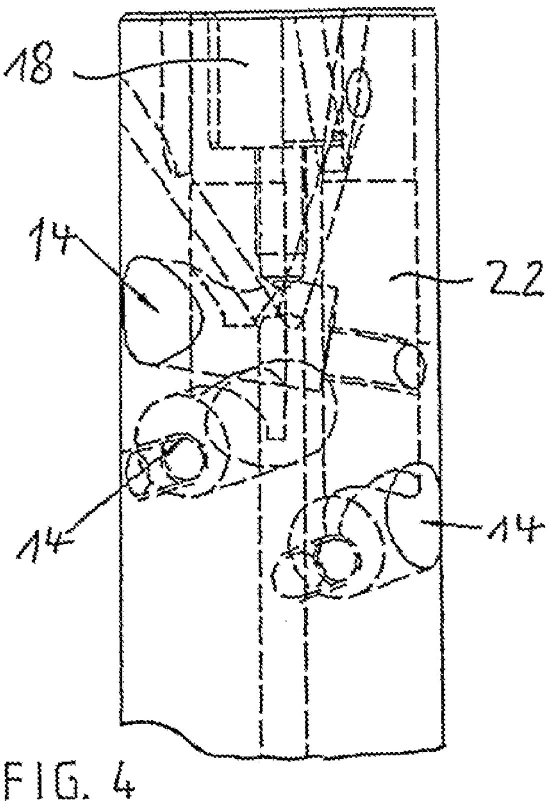
FIG. 3 is a longitudinal section through a milling head without blade holders.

The milling head shown in FIGS. 1 to 3 is comprised essentially of a base body 10 for three blade holders 11 onto which having respective blades 12 are brazed. The blade holders 11 are mounted in respective bores 22 (see FIG. 3) extending parallel to a longitudinal axis 13. Three additional bores are provided in the base body 10 extending essentially radially or at a small acute angle to a radius and holding respective wedges 14 that are displaceable radially via respective adjustment screws 15, preferably double-thread screws.

Figure 4:
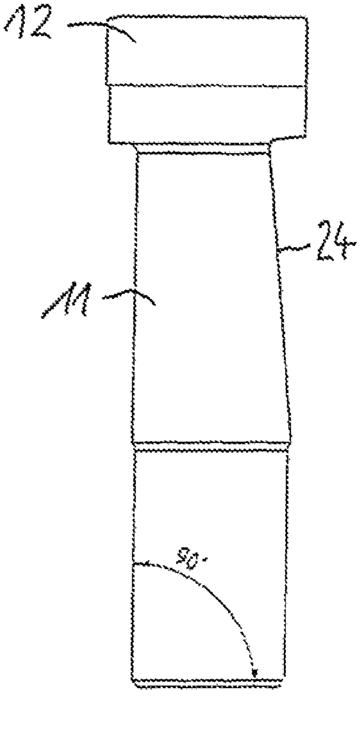
FIG. 4 is a side view of a blade holder.
Figure 5:
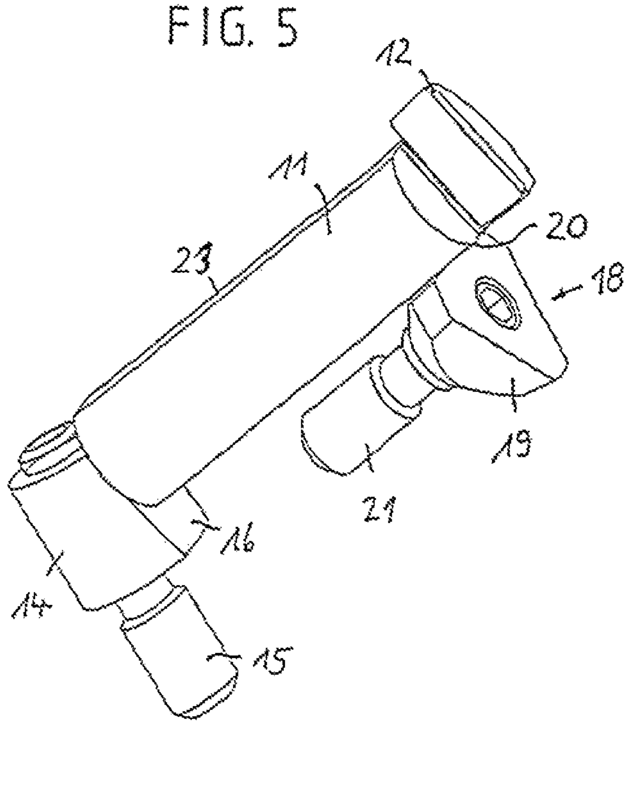
FIG. 5 is a view of the relative position of a blade holder to a clamp body and a wedge for axial adjustment.
Figure 6:
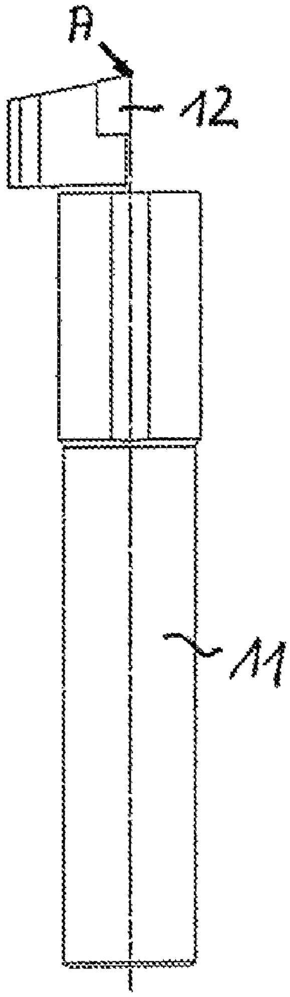
FIG. 6 is an additional side view of the blade holder.

As may be seen from FIG. 5, the wedges 14 have wedge faces 16 extending at an acute angle to a radial plane of the base body such that, on radial movement of the wedge 14, the respective blade holder 11 is moved along its longitudinal axis, i.e. axially. A clamp body 18 is used for clamping the blade holder, the clamp body being centrally positioned and having three clamping faces 19 fitting against complementary clamping faces of the blade holder 11. The clamp body 18 may be locked in place by means of a respective screw 21 that is preferably embodied as a double-thread screw. In the case shown here, the clamp body 18 serves to fix three blade holders 11 each having a planar face 20. The configuration of the clamp body 18 and the triangular shape of the clamping faces 19 ensures an exact orientation of the blades 12 and the blade holder 11 at an angle of 120° to one another (see FIG. 1). Each blade holder 11 may be axially displaced via a round wedge and the associated screw 15. The bores 22 serve to orient the blade holders and their cutting edges parallel to the axis. A face 23 serves to ensure that no line contact occurs between the blade holder 11 and the bore 22. As shown in FIG. 4, the blade holder 11 also has an angled face 24 whose angle corresponds to the angle of the face 19 of the clamp body.

Alternately, instead of the snug bores, it is possible to use an external tension ring in conjunction with a clamp body positioned on the axis, between which the blade holders 11 may be fixed. The tension ring is then screwed or shrunk onto the base body 10.

Figure 7:
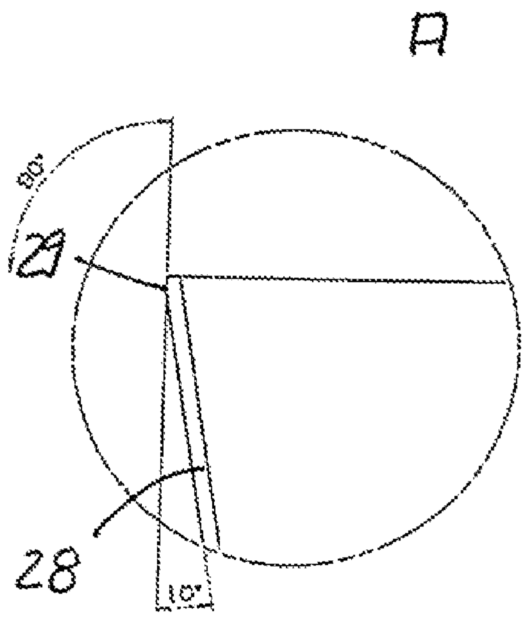
FIG. 7 is a large-scale sectional view of the region marked "A,"
Figure 8:
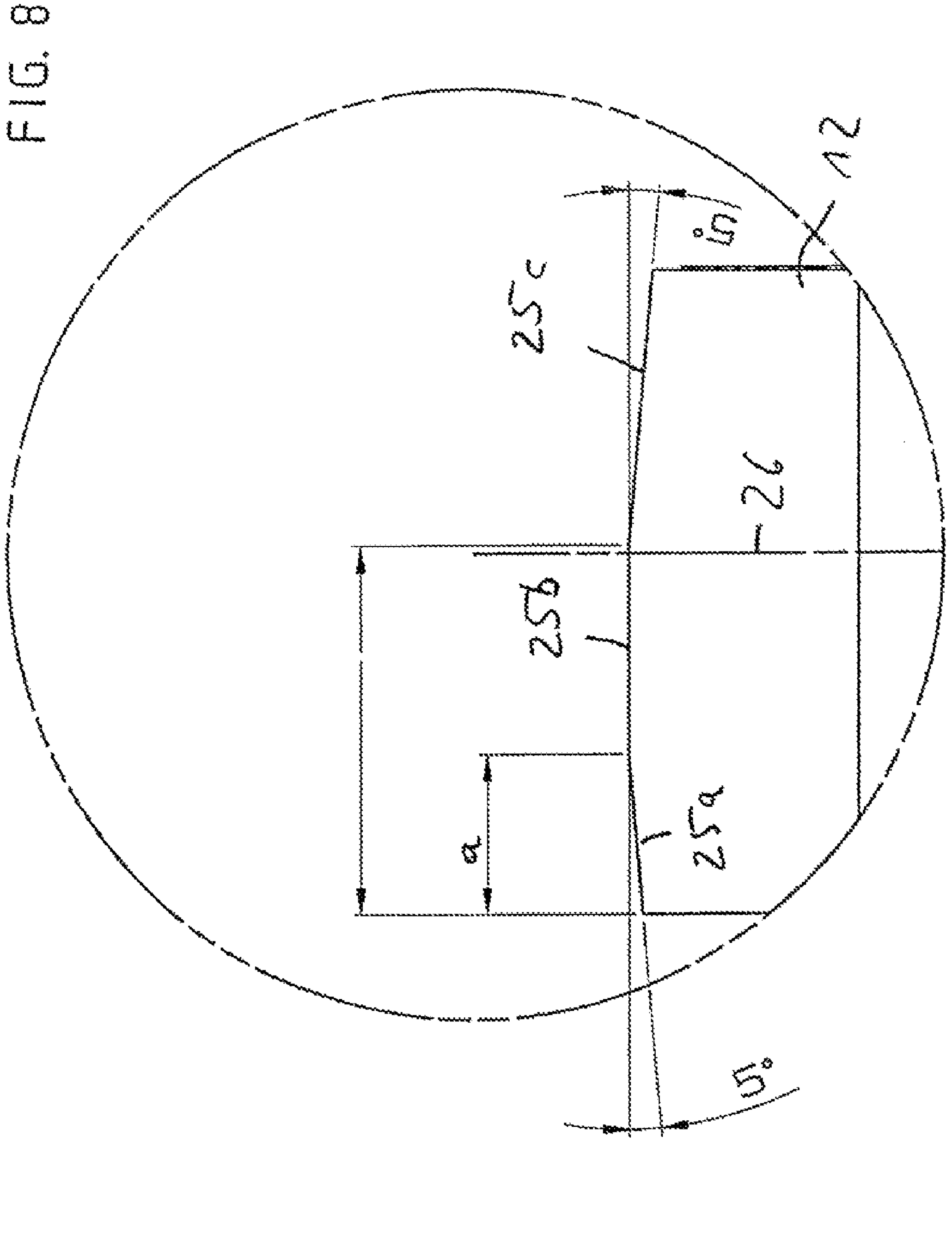

Details of the present invention are shown in particular by FIGS. 7, 9, and 10, which show enlarged views of the blades and/or the manufacture of the blades; FIG. 8 shows an optional embodiment in which inner and outer blade regions are angled back relative to a central blade region.

A bevel 29, which serves as a pre-wearing bevel, has the function of emulating the wear pattern characteristic of the method while taking into account the necessary blade bracing inward in a concave fashion. Thus, the tapered wear pattern is shortened. In a manner of speaking, one starts directly with the linear wear region. If no pre-wear bevel were to be ground into the blade, taking into account the necessary blade support running inward in a concave fashion, a deviation in shape would occur already in the tapered wear region, thus ending the useful life due to a shape deviation.

In order to obtain the blade shape according to the invention, the free face of a blade 25, while maintaining the free angle, is either abraded in an inverted V-shape (with large radii and short cut lengths) or, as shown in FIG. 9, ground in a rounded convex fashion with a radius R, preferably approximately 900 mm.

Figure 11:
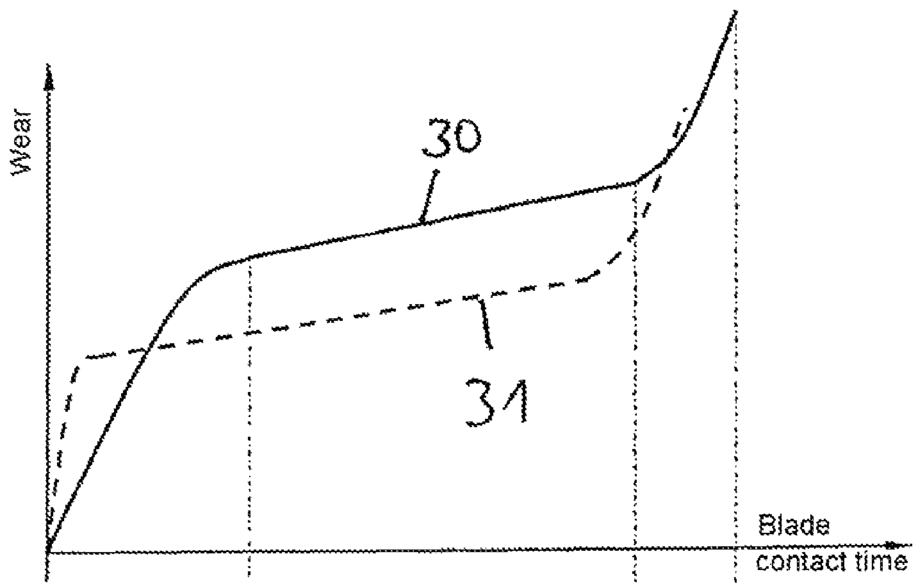
FIG. 11 is a schematic wear curve.

The embodiment according to FIG. 9 results in a distance from a highest point 27 of the blade to the lowest point of 4 μm. If, in a second process step, the bevel 29 is ground on a free face 28, with the camber angle of the blade being maintained, the illustrated embodiment of the bevel shown in FIG. 10 results, which has the largest width of 4 μm approximately in the center of the blade 25. The bevel extends to the ends of the cutting edge 25 or to a place ending shortly before the ends, with the bevel 29 tapering out to be continuously narrower until reaching a width of 0 mm at its two ends. The bevel thus results from a chord-shaped cut through a roof-shaped or convex free face that is set at a free angle of 10°. The cutting angle is uniformly 0°. The blades 12 are ground in a concave fashion at a camber angle of 90° or at a slightly smaller angle to the rotational axis of the tool, resulting in the 4 μm elevation of the point 27. This way, instead of the wear pattern according to the curve 30 in FIG. 11 that results from the blade holders known from prior art, a wear pattern 31 is achieved in which the linear wear region has been considerably lengthened in that the tapered starting wear region is shortened by a corresponding time.

In the alternate embodiment shown in FIG. 8, a lateral blade region angled by 5° extends over a length a of 2 mm, the lateral blade region being followed by a lateral blade region **25*b* extending perpendicular to a longitudinal axis 26 running parallel to the rotational axis 13. On the inner side, a lateral blade region 25*c*** follows, which is also angled by 5°.

By the configuration of angled outer regions (twin capping) of a blade prepared with a pre-wear bevel according to FIG. 8, which may be additionally selected, the inner and outer cutting region is deliberately removed from the cutting contact region. In the case of the two blades not provided with "twin capping," a higher degree of free face wear occurs in these regions. In the central cutting region where, by virtue of the method, the highest amount of free face region occurs, all three blades cut together. The wear behavior is used, so to speak, in favor of the required convex crankshaft bearing shape.

The invention claimed is:

1. A blade holder for fixing in a milling head, the holder comprising a shaft and a head with a brazed-on blade having a lateral cutting edge formed by a cutting face and a free face, the blade being formed with a bevel abutting the lateral cutting edge and formed on the free face with a bevel width tapering down at both ends to 0.

2. The blade holder according to claim 1 wherein the bevel is positioned approximately central to the lateral cutting edge.

3. The blade holder according to claim 1 wherein the maximum width of the bevel ≦10 μm.

4. The blade holder according to claim 1 wherein the bevel width continually decreases to 0 at both ends or the bevel extends over the entire width of the lateral cutting edge.

5. The blade holder according to claim 1 wherein the free face is convex and has a radius of curvature 900 mm ±100 mm.

6. The blade holder according to claim 1 wherein the free face has an angle of 10° ±2°.

7. The blade holder according to claim 6, a multisection blade with a central blade region extending perpendicular to the longitudinal axis of the shaft, and with the blade regions adjacent thereto being angled relative to the central blade region at an angle ≦10°.

8. The blade holder according to claim 7 wherein the ratio of the length of the radially outer angled blade region to the central blade region is 2:3 or the ratio of the length of the radially inner angled blade region to the radially outer lateral blade region is 2:1.

9. A milling head with multiple blade holders inserted into seats of a base body, blades being soldered onto the blade holders, the blade holders each being axially adjustable via a wedge and being fixable in the milling head by means of clamping elements, characterized by three blade holders according to claim 1 set at an equidistant angle to one another.

10. A milling head comprising:

a base body centered on, extending axially along, and rotatable relative to a body axis;

a plurality of shafts seated in the base centered on and extending along respective shaft axes equispaced angularly about and radially from the shaft axes;

respective blades braced on axial outer ends of the shafts and each having a generally flat free face directed axially outward and a flat cutting face directed angularly forward in a rotation direction of the body about the body axis and forming with the respective free face a generally straight cutting edge, the free face being formed generally centrally of the cutting edge with a bevel tapering down at both ends to 0.

* * * * *